(12) United States Patent
Amano et al.

(10) Patent No.: US 7,661,952 B2
(45) Date of Patent: Feb. 16, 2010

(54) HOT RUNNER DEVICE AND INJECTION MOLDING MACHINE

(75) Inventors: Masahiro Amano, Aichi-ken (JP); Yoshiharu Isoshima, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 339 days.

(21) Appl. No.: 11/628,978

(22) PCT Filed: Jun. 10, 2004

(86) PCT No.: PCT/JP2004/008141

§ 371 (c)(1),
(2), (4) Date: Dec. 8, 2006

(87) PCT Pub. No.: WO2005/120801

PCT Pub. Date: Dec. 22, 2005

(65) Prior Publication Data
US 2008/0014299 A1    Jan. 17, 2008

(51) Int. Cl.
*B29C 45/20* (2006.01)
(52) U.S. Cl. .................................... 425/574
(58) Field of Classification Search ............... 425/573, 425/574, 575, 576
See application file for complete search history.

(56) References Cited

U.S. PATENT DOCUMENTS

| | | | |
|---|---|---|---|
| 3,761,215 A | 9/1973 | Tondato | |
| 4,699,581 A | 10/1987 | Nagasaka et al. | |
| 4,867,938 A | 9/1989 | Schad | |
| 4,981,638 A | 1/1991 | Schad | |
| 5,183,621 A * | 2/1993 | Yukihiro et al. | 425/572 |
| 5,478,231 A | 12/1995 | Hehl | |
| 5,578,329 A | 11/1996 | Hehl | |
| 6,572,362 B2 * | 6/2003 | Boyd | 425/574 |
| 6,824,382 B2 | 11/2004 | Ganz | |

FOREIGN PATENT DOCUMENTS

JP    54-038144    11/1979

(Continued)

OTHER PUBLICATIONS

Hydraulic Injection Molding Machinery, Cincinnati Milacron pamphlet, pp. 1-8, published Feb. 1984.*

*Primary Examiner*—Tim Heitbrink
(74) *Attorney, Agent, or Firm*—Kenyon & Kenyon LLP

(57) ABSTRACT

The present invention enables one hot runner device to be shared between a plurality of molds whose resin inlets are disposed at different positions.

This hot runner device discharges supplied molten material to a resin inlet 18b of a mold 18. A hot runner body 42 comprises an inlet opening into which the molten material is supplied, an outlet opening from which the molten material is discharged, and a flow passage. The inlet opening is formed at one end, and the outlet opening is formed at the other end. The flow passage connects the inlet opening and the outlet opening. The hot runner body 42 is driven and moved by a drive mechanism 56 so that the outlet opening 52 can make contact with the resin inlet 18b of each of a plurality of molds whose resin inlets 18b are disposed at different positions. Accordingly, the hot runner device can be commonly used for the plurality of molds whose resin inlets are disposed at different positions.

11 Claims, 10 Drawing Sheets

FOREIGN PATENT DOCUMENTS

| | | |
|---|---|---|
| JP | 57-156318 U | 1/1982 |
| JP | 61-030821 | 9/1986 |
| JP | 61-291111 A | 12/1986 |
| JP | 63-290018 A | 12/1986 |
| JP | 62-009923 A | 1/1987 |
| JP | 62-121024 A | 6/1987 |
| JP | 63-084913 A | 4/1988 |
| JP | 1-308609 A | 12/1989 |
| JP | 05-005423 | 1/1993 |
| JP | 5-084811 A | 4/1993 |
| JP | 6-344406 A | 12/1994 |
| JP | 7-068612 A | 3/1995 |
| JP | 7-246637 A | 9/1995 |
| JP | 8-216239 A | 8/1996 |
| JP | 8-323828 A | 12/1996 |
| JP | 9-070859 A | 3/1997 |
| JP | 10-272656 | 10/1998 |
| JP | 11-513329 | 11/1999 |
| JP | 2000-127203 | 5/2000 |
| JP | 2001-018254 A | 1/2001 |
| JP | 2001-170967 A | 6/2001 |
| JP | 2002-028949 | 1/2002 |
| JP | 2002-240085 | 8/2002 |
| JP | 2003-103557 | 4/2003 |
| JP | 2003-170474 | 6/2003 |
| JP | 2004-174946 | 6/2004 |
| JP | 2004-174946 A | 6/2004 |
| JP | 2004-174947 A | 6/2004 |

* cited by examiner

HOT RUNNER DEVICE AND INJECTION MOLDING MACHINE

This is a 371 national phase application of PCT/JP2004/008141 filed 10 Jun. 2004.

TECHNICAL FIELD

The present invention relates to a hot runner device. Specifically, it relates to a hot runner device sharable between a plurality of molds whose resin inlets are disposed at different positions.

BACKGROUND ART

Japanese Laid-Open Patent Publication No. 2000-127203 describes a hot runner device sharable between a plurality of molds. The hot runner device is located between a stationary platen and a mold. An inlet opening is formed at one end of the hot runner device (on the side facing the stationary platen), and molten material (for example, resin material, etc.) is supplied to the inlet opening from an injection nozzle. The other end of the hot runner device has a nozzle with an outlet opening that makes contact with a sprue of the mold. The nozzles can move towards and away from the direction of contact of the outlet openings with the mold sprue. When injection molding is to be carried out, the nozzle of the hot runner device moves to a position where it makes contact with the mold sprue. When the mold is to be replaced, first the nozzle is moved in the direction away from the sprue, and then the mold is separated from the hot runner device. Then a new mold is installed. Accordingly, in the conventional art, the mold and the hot runner device can be separated and consequently the hot runner device is sharable between a plurality of molds.

DISCLOSURE OF INVENTION

In order to obtain a high quality product using injection molding, it is necessary to maintain the fluidity of the molten material within the mold. For this reason, it is necessary to adjust a position of an inlet opening (that is, a gate) for the molten material into a cavity depending on the shape of the product. However, in the above mentioned conventional art, the position of contact of the nozzle (outlet opening) of the hot runner device with the mold is fixed, and therefore a resin inlet such as a sprue must be provided in a fixed location in the mold. As a consequence, if the gate is adjusted depending on the shape of the product to be molded, the distance between the resin inlet and the gate becomes too great. As a result, in the conventional hot runner device, it was not possible to set the gate in a position appropriate for the shape of the product to be molded.

One object of the present invention is to provide a technique that enables one hot runner device to be shared between a plurality of molds whose resin inlets such as sprues are disposed at different positions.

A first hot runner device of the present invention for discharging supplied molten material to a resin inlet of mold comprises: a hot runner body comprising an inlet opening into which the molten material is supplied, an outlet opening from which the molten material is discharged, and a flow passage, wherein the inlet opening is formed at one end, and the outlet opening is formed at the other end, and the flow passage connects the inlet opening and the outlet opening; and a drive mechanism for driving the hot runner body in a manner that enables the outlet opening to make contact with the resin inlet of each of a plurality of molds whose resin inlets are disposed at different positions.

In this hot runner device, the outlet opening of the hot runner body can be made to make contact with the resin inlet of each of a plurality of molds whose resin inlets are disposed at different positions by means of driving the hot runner body. As a result, the hot runner device can be shared between a plurality of molds whose resin inlets are disposed at different positions.

In the first device, the hot runner body may rotate in its axial direction, and the outlet opening may be disposed at a part other than a rotative axis of the hot runner body. It is preferred that the drive mechanism is provided with a means for rotating the hot runner body in the axial direction. In this device, the position of the outlet opening of the hot runner body can be moved by rotating the hot runner body. Since the position of the outlet opening is moved by rotating the hot runner body, the hot runner device can be made compact.

Further, in the case where the drive mechanism rotates the hot runner body in the axial direction, as described above, it is preferred that the inlet opening is disposed at the rotative axis of the hot runner body. When the inlet opening is disposed at the rotative axis of the hot runner body, the position of the inlet opening does not change even when the hot runner body rotates, and consequently the hot runner device can easily be connected with the injector or the plasticizing machine.

Furthermore, in the first device, the hot runner body can move undeviatingly with respect to a mold platen or the mold, and the drive mechanism may be provided with a means for moving the hot runner body undeviatingly with respect to the mold platen or the mold. In this device, the hot runner body moves undeviatingly and consequently positions where the outlet opening makes contact with the mold surface (i.e. a range where the resin inlet can be provided) can be greatly enlarged. In particular, in the case where the drive mechanism is provided with both a rotation means and an undeviatingly moving means, the outlet opening can be moved across a wide range within a compact configuration.

A storage for storing molten material supplied from the inlet opening may be formed within the flow passage of the hot runner body. It is preferred that the hot runner body further comprises a means for injecting the molten material stored in the storage from the outlet opening. The hot runner device has the function of injecting the molten material, and consequently the injector can be dispensed with.

A second hot runner device of the present invention comprise an inlet opening into which molten material is supplied and an outlet opening from which the molten material is discharged to a resin inlet of a mold. The inlet opening is formed at one end and the outlet opening is formed at the other end. The hot runner device comprises means for moving the position of the outlet opening to adjust to the resin inlet of each of a plurality of molds whose resin inlets are disposed at different positions. The same operation and effects can be achieved with this hot runner device as with the first hot runner device described above.

Moreover, by using the aforementioned hot runner device, the present invention also provides a novel injection molding machine. That is, the injection molding machine of the present invention comprises a movable mold, a stationary mold, a movable platen to which the movable mold is removably attached, a stationary platen to which the stationary mold is removably attached, one or a plurality of hot runner device for supplying resin to a resin inlet provided on the movable mold or the stationary mold, and an injector for supplying molten material to the hot runner device.

In this injection molding machine, the hot runner body is moved according to the mold to which it is attached even when a plurality of molds having different resin inlets is attached to the mold platen, and the outlet opening of the hot runner device can be made to make contact with the resin inlet of the mold.

In this injection molding machine, an injection hole of the injector makes contact with an inlet opening of the hot runner device and, in this state, the molten material can be injected from the injector to the hot runner device. In this case, it is preferred that the injection molding machine further comprises means for moving the injection hole of the injector to a position corresponding to the position of the inlet opening of the hot runner body when the hot runner body is driven by the drive mechanism such that the position of the inlet opening thereof is moved. Even when the position of the inlet opening of the hot runner body changes, the injector moves in accordance with this change in position, and consequently the hot runner body can be supplied with resin from the injector.

In this case, it is preferred that the hot runner body is driven by the rotation means and the undeviatingly moving means, and that the inlet opening is disposed at the rotative axis of the hot runner body. Since the inlet opening is disposed at the rotative axis of the hot runner body, the injector may equally well be moved only undeviatingly.

In the case where the injection molding machine is provided with a plurality of the hot runner devices, each of the hot runner devices can be provided with an injector. Since each of the hot runner devices is provided with the injector, the pressure, speed, and injection amount can be controlled for each of the hot runner devices.

Further, an injection hole of the injector and an inlet opening of the hot runner device may be connected by a flexible pipe. The connecting pipe can change shape even when the inlet opening moves as the hot runner body is driven, and consequently the injector does not need to be moved.

Moreover, by using the aforementioned hot runner device that has the function of injecting the molten material, the present invention also provides a novel injection molding machine. That is, another injection molding machine of the present invention comprises a movable mold, a stationary mold, a movable platen to which the movable mold is removably attached, a stationary platen to which the stationary mold is removably attached, one or a plurality of hot runner device provided with an injection function for supplying resin to a resin inlet provided on the movable mold or the stationary mold, and a plasticizing machine for supplying molten material to the hot runner device.

In this injection molding machine, the hot runner device has the injection function, and consequently the plasticizing machine can be connected with the hot runner device.

It is preferred that the plasticizing machine comprises a supply hole for supplying the molten material to the hot runner device, and that the supply hole and the inlet opening of the hot runner device are connected by a flexible pipe. Since the supply hole and the inlet opening are connected by the flexible pipe, the plasticizing machine need not be moved in accordance with the movement of the hot runner body.

It is preferred that, in the case where a plurality of the hot runner devices having the injection function are provided, the supply hole of one plasticizing machine is connected with the inlet openings of the plurality of hot runner devices by a flexible pipe. Each of the hot runner devices has the injection function, and consequently the pressure, speed, and injection amount of the molten material can be controlled for each of the hot runner devices. Furthermore, the molten material can be supplied to the plurality of hot runner devices from the one plasticizing machine, and consequently the number of plasticizing machines can be reduced.

BEST MODE FOR CARRYING OUT THE INVENTION

First Embodiment

Figure 1:
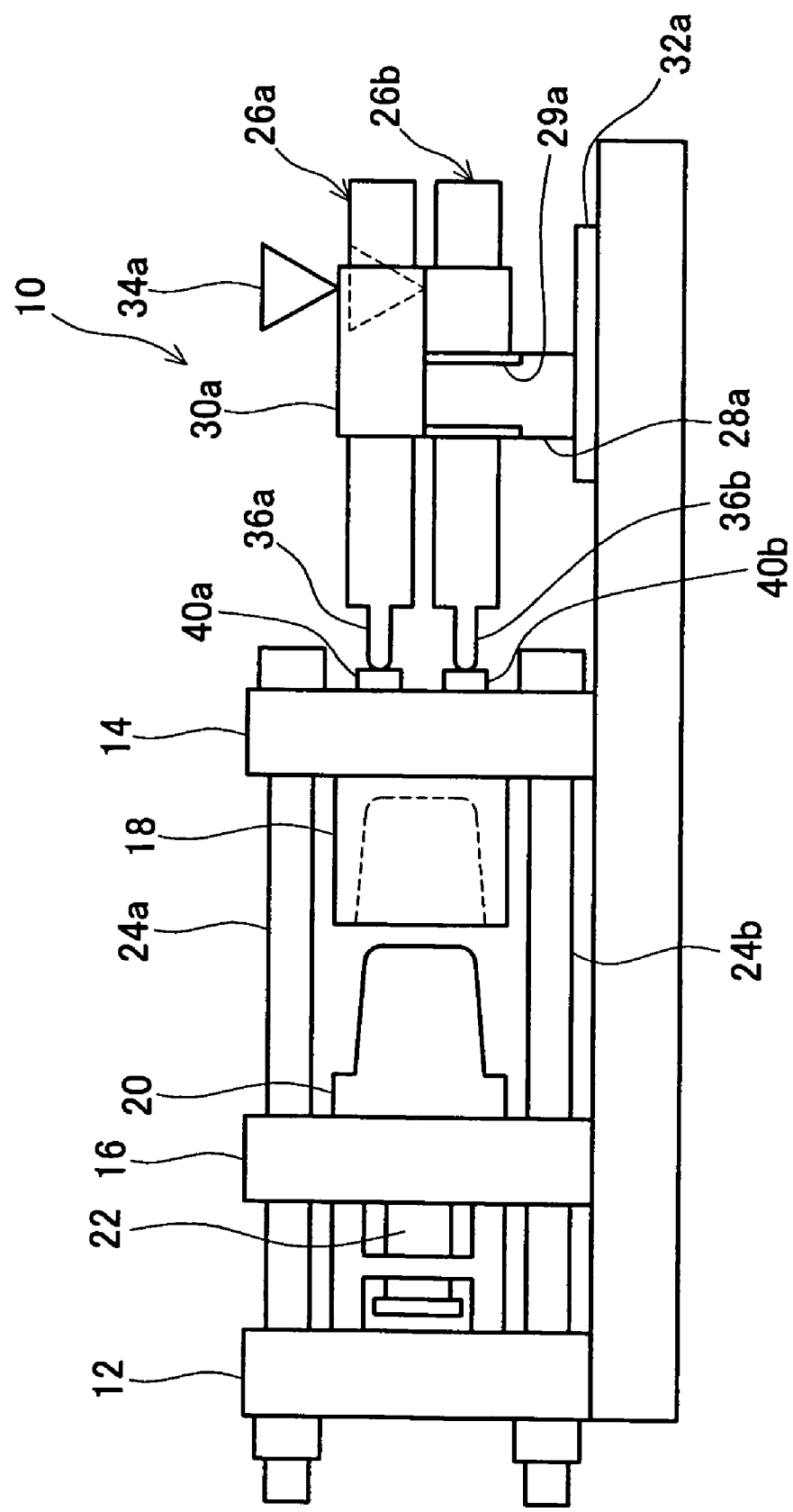
FIG. 1 is a side view showing an injection molding machine of a first embodiment.

Next, an embodiment of an injection molding machine of the present invention will be described with reference to figures. First, the overall configuration of the injection molding machine of the present embodiment will be explained. FIG. 1 is a side view schematically showing the configuration of an injection molding machine of the present embodiment. As shown in FIG. 1, the injection molding machine of the present embodiment comprises a cylinder plate 12, a movable platen 16 to which a movable mold 20 is attached, and a stationary platen 14 to which a stationary mold 18 is attached. The cylinder plate 12 and the stationary platen 14 are connected by tie-bars 24a and 24b. The tie-bars 24a and 24b pass through through-holes (not shown) formed in the movable platen 16, and serve to guide the movable platen 16.

A cylinder unit 22 is disposed between the cylinder plate 12 and the movable platen 16. When the cylinder unit 22 operates, the movable platen 16 is guided by the tie-bars 24a and 24b and moves in the direction towards and away from the stationary platen 14. In this manner, the opening and closing of the movable mold 20 and the stationary mold 18 is carried out. Due to the operation of the cylinder unit 22, molding force is generated between the movable platen 16 (the movable mold 20) and the stationary platen 14 (the stationary mold 18).

The stationary platen 14 has hot runner devices 40a and 40b (to be described later) attached thereto. Molten resin is supplied to the hot runner devices 40a and 40b from injectors 26a and 26b respectively. Since the injectors 26a and 26b are identical in configuration, only the injector 26a, which supplies resin to the hot runner device 40a, will be explained.

The injector 26a is a conventional device that injects molten resin from a nozzle 36a, the molten resin being formed by melting pellet-shaped resin within a hopper 34a. A first frame 30a is attached to the injector 26a. The first frame 30a can be moved in the up-down direction by a motor (not shown) along guide rails 29a provided on a second frame 28a. Moreover, the second frame 28a can be moved by a motor (not shown) along guide rails 32a in a direction towards and away from the stationary platen 14. As a result, the injector 26a can move in a vertical direction and in the direction towards and away from the stationary platen 14.

Figure 2:
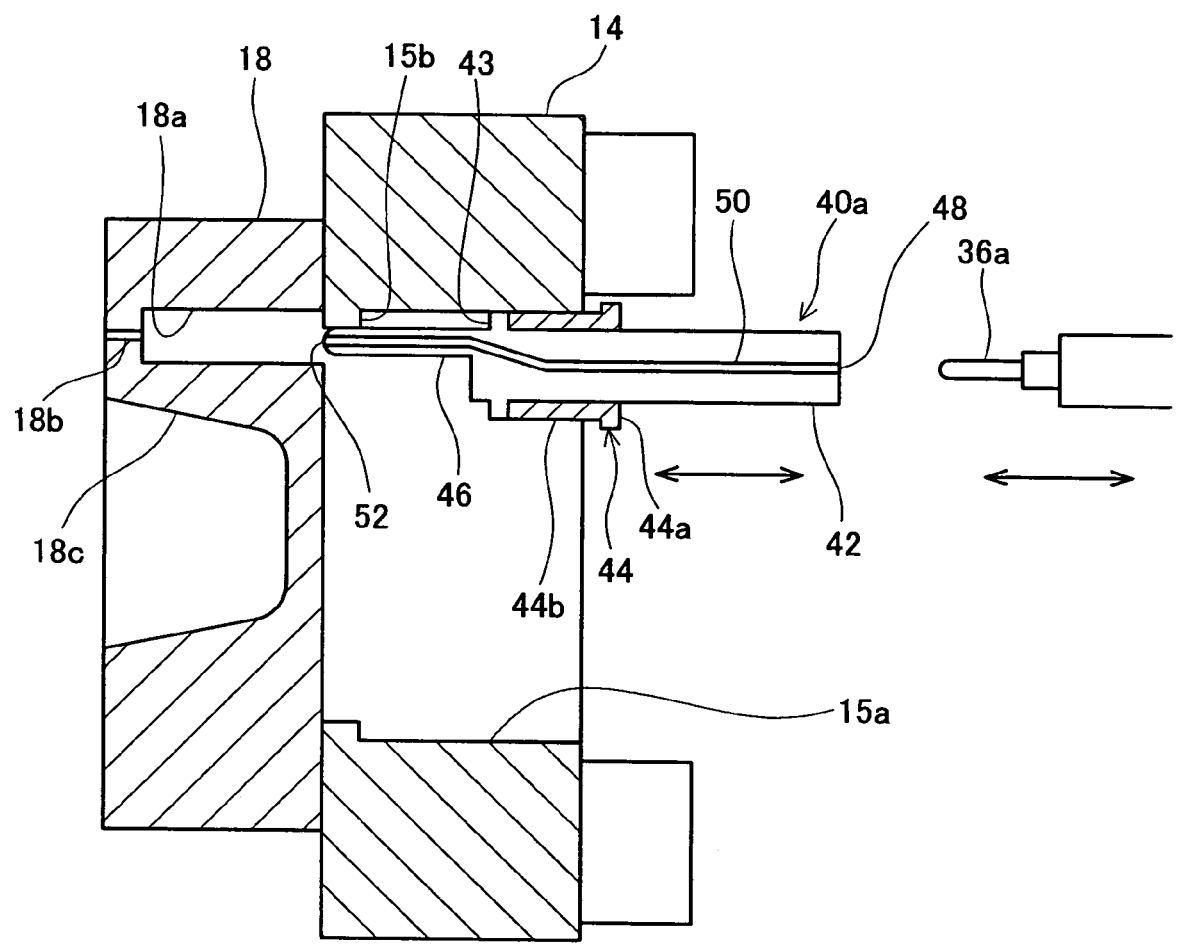
FIG. 2 is a view showing a state where a hot runner device is moved away from the interior of a stationary mold.

Next, the hot runner devices 40a and 40b attached to the stationary platen 14 will be explained. Since the hot runner devices 40a and 40b are identical in configuration, only the hot runner device 40a is explained with reference to FIGS. 2-4. FIG. 2 shows a state where the hot runner device 40a is moved away from an insertion hole 18a of the stationary mold 18, FIG. 3 shows a state where the anterior end of the hot runner device 40a is pushed into a sprue 18b of the stationary mold 18, and FIG. 4 shows the stationary platen viewed from the direction of the injectors.

Figure 3:
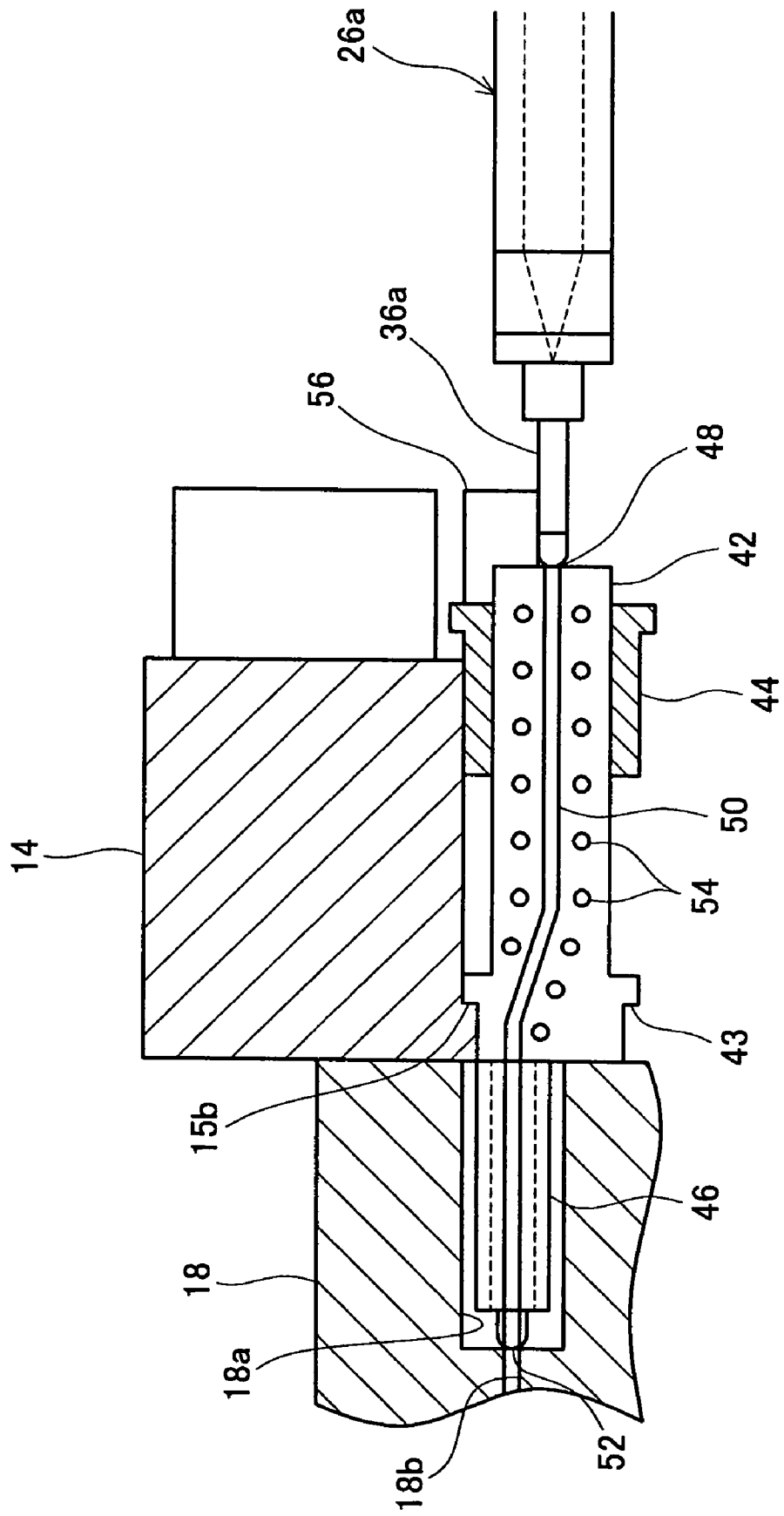
FIG. 3 is a view showing a state where an anterior end of the hot runner device has been pushed into a sprue of the stationary mold.

As shown in FIGS. 2 and 3, the hot runner device 40a comprises a holder 44, and a hot runner body 42 attached in a rotatable manner to the holder 44. The holder 44 comprises a rectangular shaped guiding plate 44a located at the injector 26a side, and a cylindrical portion 44b fixed to a stationary mold 18 side face of the guiding plate 44a (FIGS. 2 and 4). A cross-sectionally circular through hole is formed in the center of the guiding plate 44a, and the through hole connects to the cylindrical portion 44b. The cross-sectionally circular hot runner body 42 is inserted into the through hole of the guiding plate 44a and the cylindrical portion 44b. Consequently, the hot runner body 42 is supported in an axially rotatable manner with respect to the holder 44, and can move in a direction towards and away from the sprue 18b of the stationary mold 18.

Figure 4:
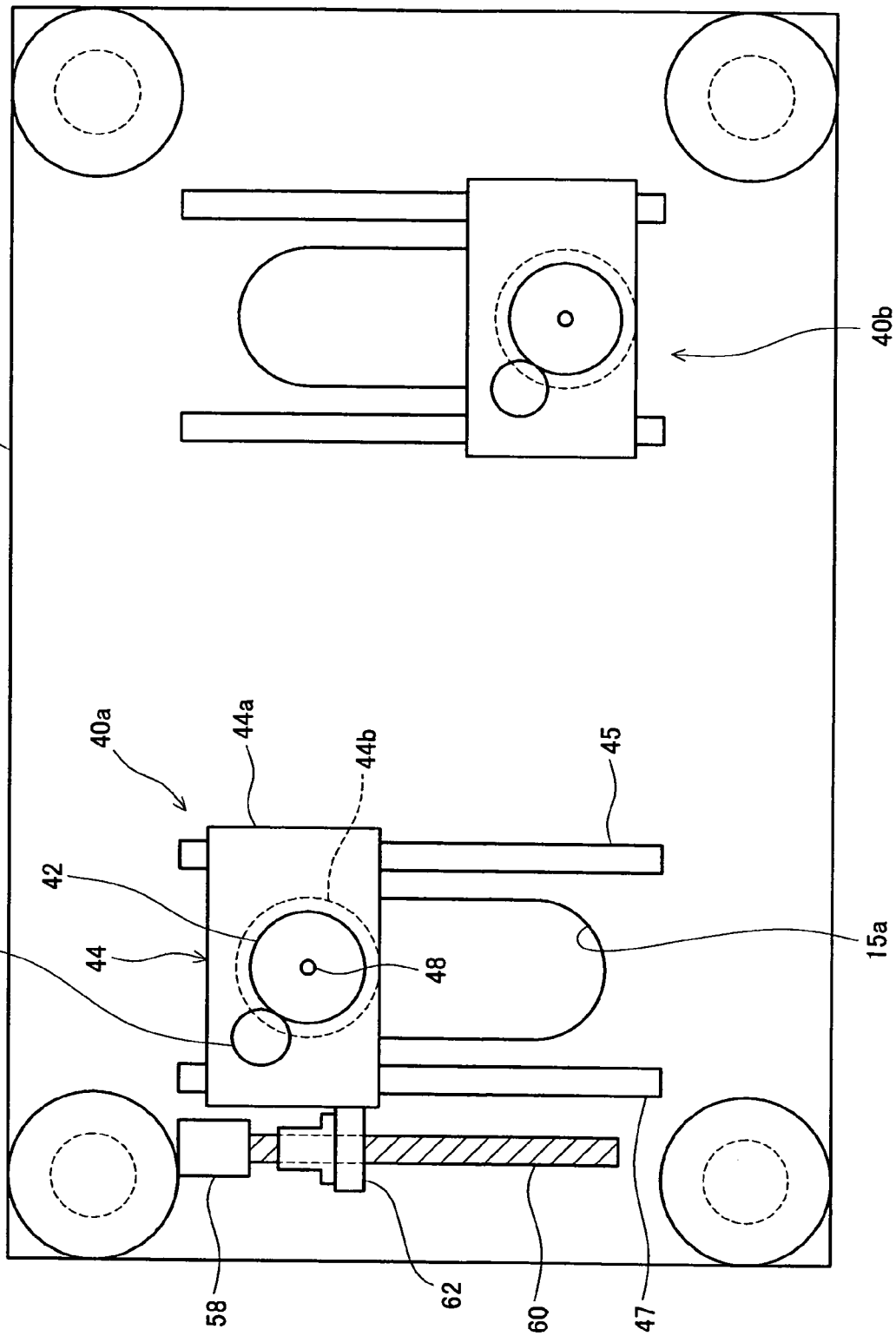
FIG. 4 is a view showing a stationary platen viewed from the direction of injectors.

As shown in FIG. 4, a motor 56 is fixed on a injector 26a side surface of the guiding plate 44a. A gear fixed to an output shaft of the motor 56 engages with a gear formed on the outer circumference of the hot runner body 42. When the motor 56 rotates, the hot runner body 42 rotates.

As shown in FIG. 4, the guiding plate 44a of the holder 44 is attached to the surface of the stationary platen 14 at the injector 26a side. Specifically, a hot runner attachment hole 15a is formed in the stationary platen 14. Guide rails 45 and 47 are formed on the left and right of the hot runner attachment hole 15a. The guiding plate 44a is attached to these guide rails 45 and 47. Furthermore, a screw member 62 is attached to the guiding plate 44a. The screw member 62 is engaged with a ball screw 60, and the ball screw 60 is rotated by the motor 58. Consequently, when the motor 58 rotates, the ball screw 60 rotates and as a result the guiding plate 44a is guided into the guide rails 45 and 47 and moves in the vertical direction. Instead of using the ball screw 60, the mechanism for moving the guiding plate 44a in a vertical direction may be a moving mechanism provided with a cylinder mechanism or a rack and pinion mechanism.

The hot runner attachment hole 15a passes through the stationary platen 14. As a result, the hot runner body 42 supported by the holder 44 is able to pass through the hot runner attachment hole 15a and towards the stationary mold 18 side thereof. An inner wall surface of the hot runner attachment hole 15a has a convex portion 15b formed thereon that controls the movement of the hot runner body 42 towards the stationary mold 18.

As shown in FIGS. 2 and 3, the hot runner body 42 has a nozzle 46 that protrudes from an end surface thereof at the stationary mold 18 side. The tip of the nozzle 46 has an outlet opening 52 that releases molten resin from the hot runner body 42. As shown in the figure, the nozzle 46 is located in a position separated from and above the rotative axis of the hot runner body 42. For this reason, the outlet opening 52 of the nozzle 46 can be moved with respect to the stationary mold 18 by rotating the hot runner body 42.

An inlet opening 48 is provided on the end surface of the hot runner body 42 at the injector 26a side thereof. As shown in FIG. 4, the inlet opening 48 is located at the rotative axis of the hot runner body 42. For this reason, the location of the inlet opening 48 does not change even if the hot runner body 42 rotates. Molten resin from the nozzle 36a of the injector 26a is supplied to the inlet opening 48.

The outlet opening 52 and the inlet opening 48 described above are connected by a resin path 50 along which the molten resin flows. As shown in FIG. 3, a heater 54 is disposed around the periphery of the resin path 50 for heating the molten resin flowing within the resin path 50.

A protrusion 43 is formed on the outer circumference of the hot runner body 42. The protrusion 43 makes contact with the convex portion 15b formed on the inner wall surface of the hot runner attachment hole 15a, thereby controlling the movement of the hot runner body 42 towards the stationary mold 18 (the state shown in FIG. 3). Furthermore, the protrusion 43 makes contact with the cylindrical portion 44b of the holder 44, thereby controlling the movement of the hot runner body 42 in the direction of the injector 26a (the state shown in FIG. 2).

Next, the operation of the injection molding machine is explained. In order to carry out molding with the above injection molding machine, first the hot runner body 42 is positioned so as to bring into contact the nozzle 46 (outlet opening 52) of the hot runner body 42 with the sprue 18b of the stationary mold 18. This is carried out by the rotation of the motor 56, resulting in the rotation of the hot runner body 42, and the rotation of the motor 58, causing the holder 44 to move in a vertical direction with respect to the stationary platen 14. This position adjustment is carried out with the hot runner device 40b as well.

After the positioning of the hot runner bodies 40a and 40b is completed, the position of the nozzle 36a of the injector 26a is adjusted. Since the inlet opening 48 of the hot runner body 42 is located at the rotative axis of the hot runner body 42, it is sufficient to move the injector 26a in the vertical direction. The position of the nozzle 36b of the injector 26b is adjusted in the same manner as in the injector 26a.

Next, the injectors 26a and 26b are moved towards the stationary platen 14. In this manner, the nozzles 36a and 36b of the injectors 26a and 26b make contact with the inlet openings of the hot runner bodies 40a and 40b. After the nozzles 36a and 36b have made contact with the inlet openings of the hot runner bodies 40a and 40b, the injectors 26a and 26b are moved towards the stationary platen 14 and the hot runner body 42 is inserted into the insertion hole 18a of the stationary mold 18. Then the anterior end of the nozzle 52 of the hot runner body 42 is brought into contact with the sprue 18b of the stationary mold 18. In this state, resin in a molten state is injected from the injectors 26a and 26b. The injected resin flows through the hot runner devices 40a and 40b, passes through the sprue 18b of the stationary mold 18, and is injected into a cavity. Since the injectors 26a and 26b are provided on both the hot runner devices 40a and 40b, the pressure, speed, and injection amount can be varied for both the hot runner devices 40a and 40b. Due to this, a better flow of resin can be achieved inside the cavity. When molding similar products (when using the same mold), there is no need to readjust the position of the injectors 26a and 26b and the hot runner devices 40a and 40b.

When the mold is to be replaced, the injectors 26a and 26b are moved away from the stationary platen 14 and the nozzles of the hot runner devices 40a and 40b are moved away from the insertion hole 18a of the stationary mold 18 (the state shown in FIG. 2). The removal of the nozzles of the hot runner devices 40a and 40b may be carried out by means of a spring that pushes the hot runner body toward the injectors 26a and 26b.

After the nozzles have been removed, the nozzles of the hot runner devices 40a and 40b and the stationary mold 18 do not interfere with one another, thereby allowing easy replacement of the stationary mold 18 and the movable mold 20. After the stationary mold 18 and the movable mold 20 have been replaced, the positions of the hot runner devices 40a and 40b and the injectors 26a and 26b are adjusted with respect to a sprue of the new stationary mold 18.

As is clear from the above description, the hot runner devices 40a and 40b of the present embodiment move the hot runner body rotatably and undeviatingly with respect to the stationary platen 14. By this means, the tips of the nozzles of the hot runner devices 40a and 40b can be attached to a specified region of the stationary mold 18. As a result, a sprue that corresponds to the shape of the product can be designed relatively easily, and a good resin flow can be achieved.

Second Embodiment

Next, a hot runner device of a second embodiment of the present invention is explained with reference to FIG. 5. The hot runner device of the second embodiment has an identical configuration to the hot runner device of the first embodiment, but differs in the injection function for injecting molten resin into the hot runner device. The aspects that differ from the first embodiment are described below.

Figure 5:
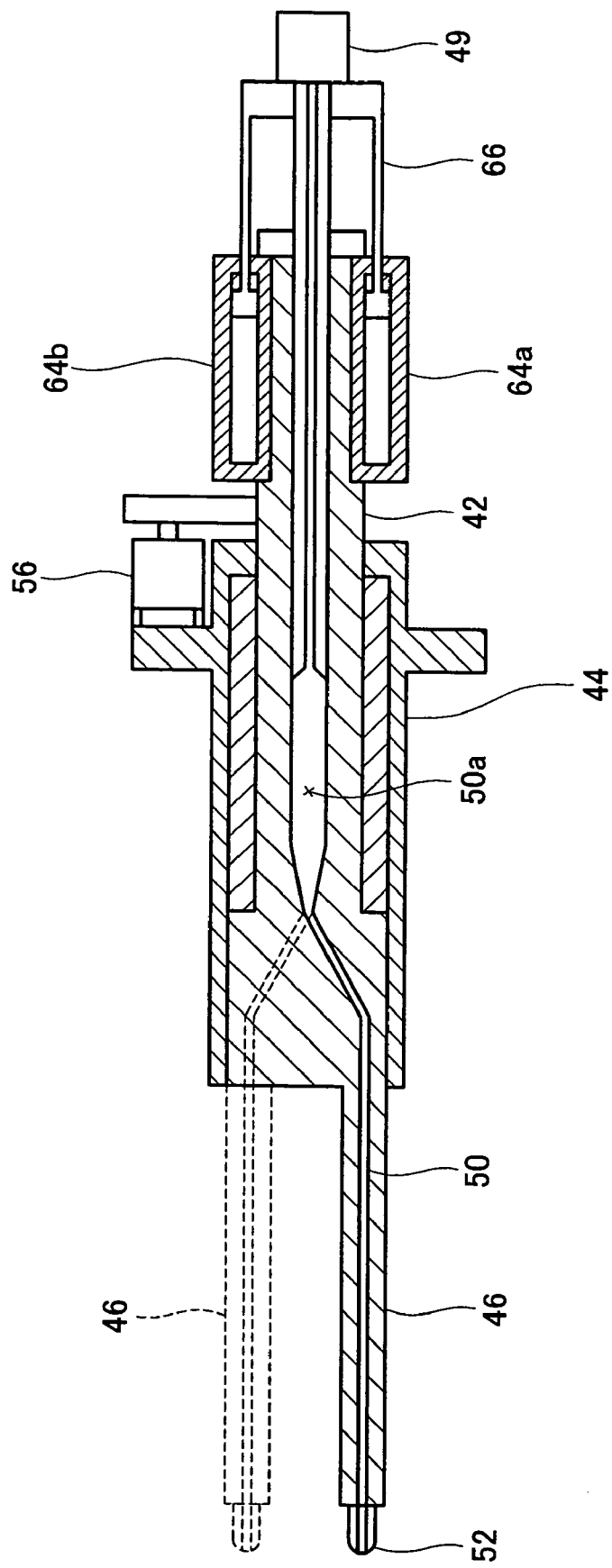
FIG. 5 is a cross-sectional view of a hot runner device of a second embodiment.

As shown in FIG. 5, the hot runner device of the second embodiment also comprises a holder 44, and a hot runner body 42 rotatably supported on the holder 44. A resin flow path 50 of the hot runner device 42 has a storage chamber 50a for storing molten resin. The hot runner device also comprises cylinders 64a and 64b for injecting the molten resin that is stored in the storage chamber 50a, and a piston 66 driven by the cylinders 64a and 64b. As a result, when the piston 66 is driven by the cylinders 64a and 64b, the molten resin in the storage chamber 50a is discharged from an outlet opening 52.

In the second embodiment, a posterior end 49 of the hot runner device is connected via a flexible pipe to a resin supply hole of a plasticizing machine. By this means, molten resin that is melted by the plasticizing machine is supplied to the hot runner device via the flexible pipe. Consequently, since the hot runner device and the plasticizing machine are connected via the flexible pipe, it is not necessary to move the plasticizing machine together with the hot runner body in the hot runner device of the second embodiment. Moreover, since each hot runner device has an injection function, the molten resin can be supplied into the mold with the appropriate injection pressure, injection speed and injection amount for each hot runner device.

Third Embodiment

Next, a hot runner device of a third embodiment of the present invention is explained with reference to FIGS. 6 to 8. The hot runner device of the third embodiment differs from that of the first and second embodiments in that the hot runner device is attached directly to the stationary mold 18, and in that the hot runner body 42 moves along an x-axis direction and a y-axis direction.

Figure 6:
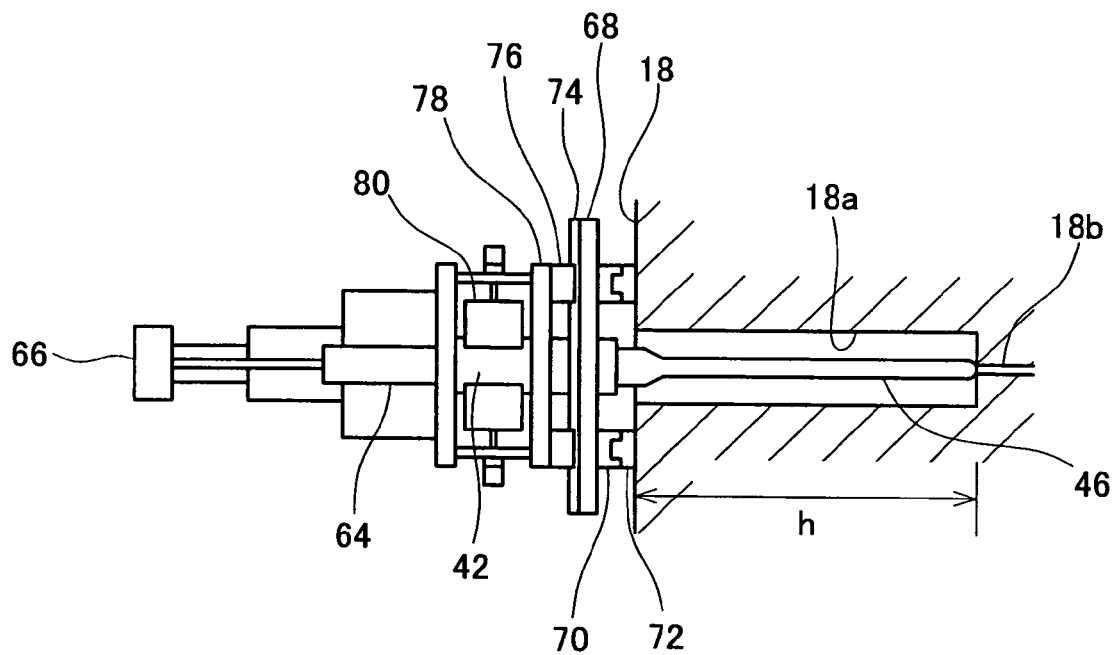
FIG. 6 is a front view of a hot runner device of a third embodiment.
Figure 7:
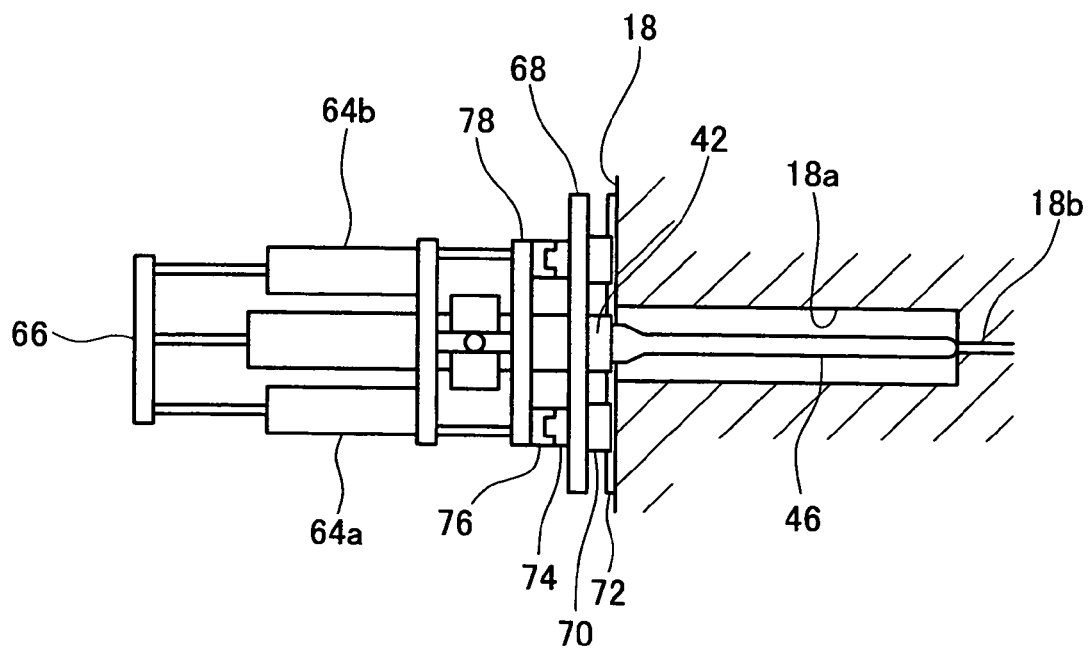
FIG. 7 is a plan view of the hot runner device of the third embodiment.
Figure 8:
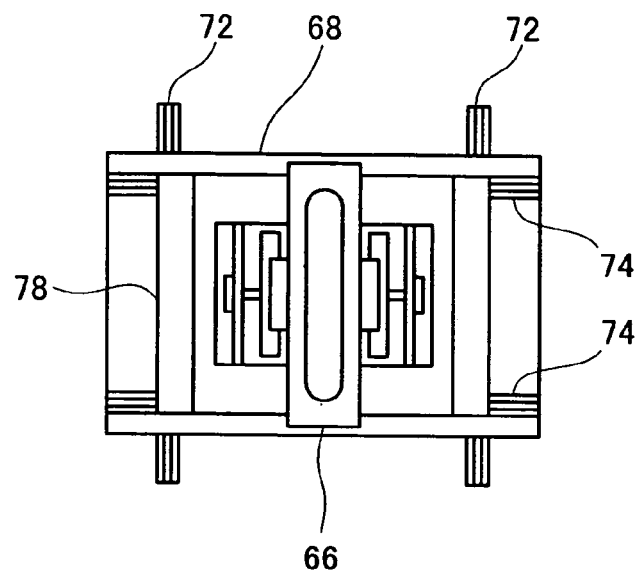
FIG. 8 is a left side view of the hot runner device of the third embodiment.

As shown in FIGS. 6 to 8, first guide rails 72 are mounted on the surface of the stationary mold 18. First slider 70 fixed on the lower surface of a first table 68 is connected to the first guide rails 72. Second guide rails 74 are mounted on the upper surface of the first table 68 and extend in a direction perpendicular to the first guide rails 72. Second slider 76 fixed on the lower surface of a second table 78 is connected to the second guide rails 74. The hot runner body 42 is supported on the second table 78 so as to be movable along its axial direction. As a result, the tip of the hot runner body 42 can be moved in the x-y direction with respect to the stationary mold 18 by means of the first table 68 being guided by the first guide rails 72 and by the second table 78 being guided by the second guide rails 74. For example, an actuator can be provided for driving the first table 68 with respect to the stationary mold 18, and an actuator can be provided to drive the second table 78 with respect to the first table 68. The tip of the hot runner body 42 can be moved in the x-y direction with respect to the stationary mold 18 by operating these actuators.

The hot runner body 42 is moved in its axial direction by means of a cylinder (not shown) or by hand until it makes contact with the sprue 18b provided on a location that differs from the mold surface by a depth h. When a nozzle 46 of the hot runner body 42 makes contact with the sprue 18b, the axial movement of the hot runner body 42 is stopped by a slide locking device 80. In the third embodiment as well, molten resin stored in the hot runner body 42 can be injected by driving a piston 66 by means of oil pressure cylinders 64a and 64b.

Moreover, this hot runner device can be attached to locations other than the stationary mold; for example, it can be attached to the movable mold, stationary platen, or the movable platen, etc.

Fourth Embodiment

Next, an injection molding machine of a fourth embodiment of the present invention is explained with reference to FIGS. 9 to 14. First the overall configuration of the injection molding machine is explained with reference to FIGS. 9 to 12. In FIGS. 9 to 12, a hot runner device is not shown.

As shown in FIGS. 9 to 12, the injection molding machine of the present embodiment comprises two parallel C-shaped frames 112a and 112b. Two sliding beds 140a and 140b are provided at the outer sides of the C-shaped frames 112a and 112b and are parallel to the C-shaped frames 112a and 112b.

The upper surfaces of the sliding beds 140a and 140b respectively have guide rails 144a and 144b provided thereon. Sliders 146a and 146b are provided on the lower surface of the stationary platen 124 and are respectively guided by the guide rails 144a and 144b. Consequently the stationary platen 124 slides above the sliding beds 140a and 140b. Sliders 142a and 142b are provided on the lower surface of a movable platen 130, and these are guided by the guide rails 144a and 144b. As a result, the movable platen 130 also moves above the sliding beds 140a and 140b.

A stationary mold 126 is removably attached to a surface of the stationary platen 124 facing the movable platen 130. A movable mold 128 is removably attached to a surface of the movable platen 130 facing the stationary platen 124. The movable platen 130 can move in a direction towards and away from the stationary platen 124 by means of an oil pressure device (not shown). When the movable platen 130 moves in the direction of the stationary platen 124, the movable mold 128 and the stationary mold 124 close (the state shown in FIG. 9). When the movable platen 130 moves away from the stationary platen 124, the movable mold 128 and the stationary mold 126 open (the state shown in FIG. 10).

Cylinder units (120a, 116a) are provided between the stationary platen 124 and the C-shaped frame 112a. Cylinder units (120b, 116b) are provided between the stationary platen 124 and the C-shaped frame 112b. Since the two cylinder units (120a, 116a) and (120b, 116b) have the same configuration, only the cylinder units (120a, 116a) are explained below.

Figure 9:
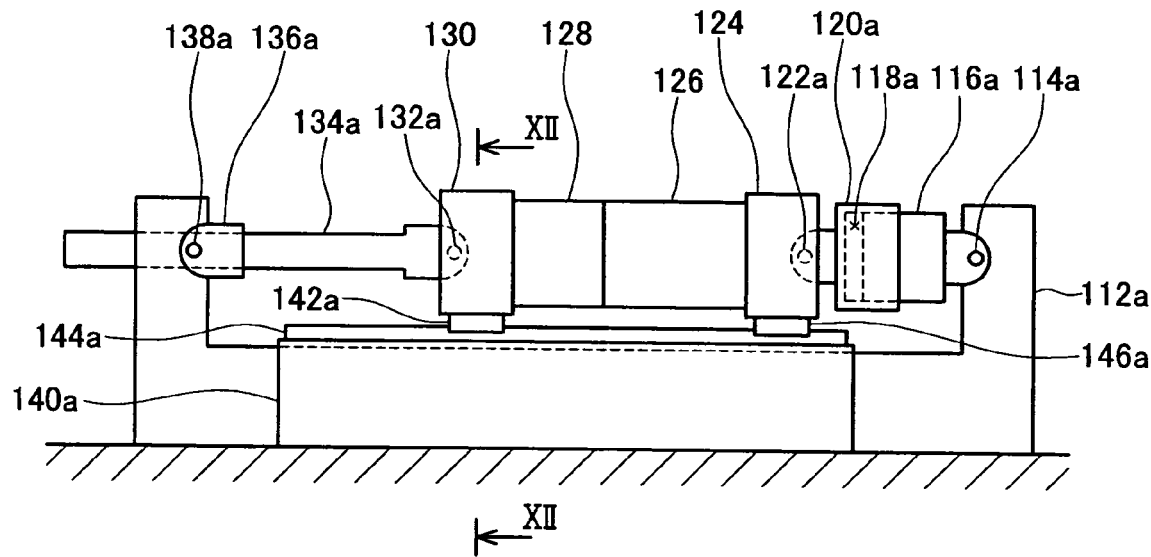
FIG. 9 is a side view showing an injection molding machine of a fourth embodiment.
Figure 10:
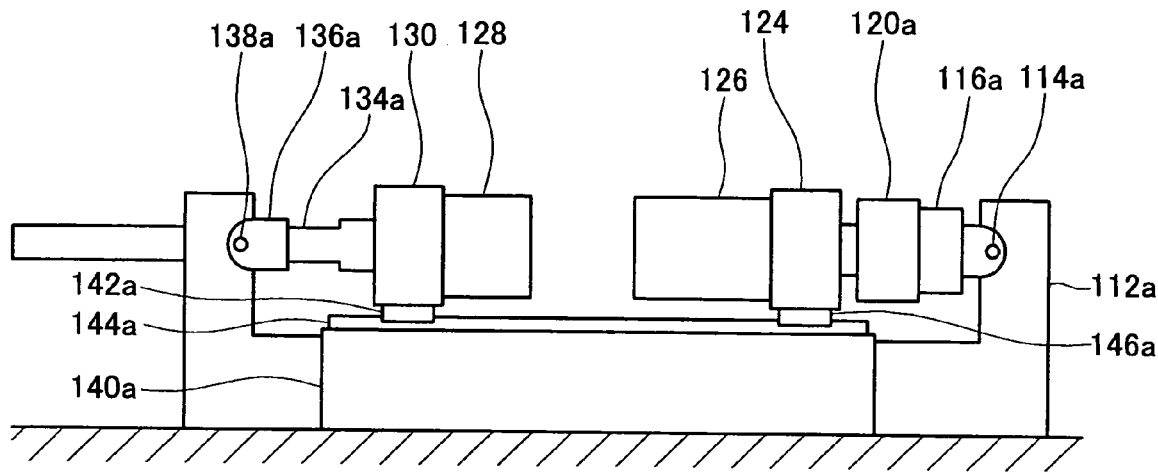
FIG. 10 is a side face view showing the mold of the injection molding machine shown in FIG. 9 in an open state.
Figure 11:
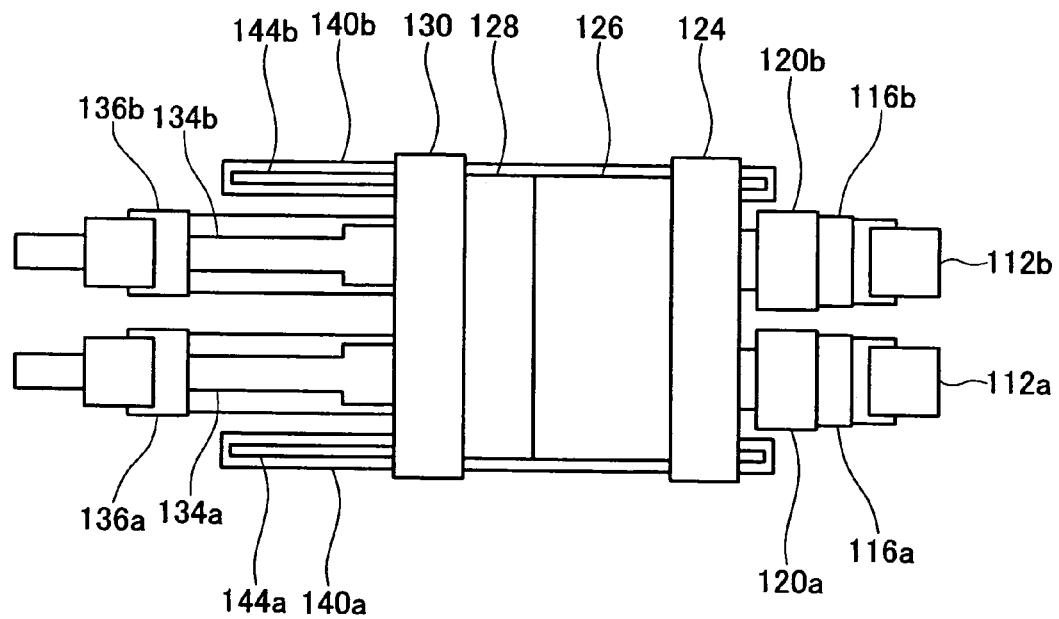
FIG. 11 is a plan view of the injection molding machine shown in FIG. 9.
Figure 12:
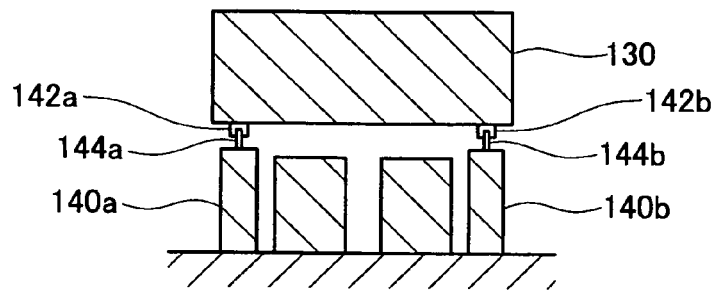
FIG. 12 is a cross-sectional view along the line XII-XII of FIG. 9.

As shown in FIG. 9, the cylinder units (120a, 116a) comprises a cylinder 120a and a piston 116a. One end of the cylinder 120a is pivotably connected to the stationary platen 124 via a horizontal shaft 122a. The other end of the cylinder 120a has a cylinder chamber 118a provided thereon. The piston 116a is disposed within the cylinder chamber 118a. The other end of the piston 116a is pivotably connected to the C-shaped frame 112a via the horizontal shaft 114a.

A force transmitting mechanism (134a, 136a) is provided between the movable platen 130 and the C-shaped frame 112a. The force transmitting mechanism (134a, 136a) transmits force for closing the mold from the C-shaped frame 112a to the movable platen 130. A force transmitting mechanism (134b, 136b) is also provided between the movable platen 130 and the C-shaped frame 112b. Since both the force transmitting mechanisms (134a, 136a) and (134b, 136b) have an identical configuration, only the force transmitting mechanism (134a, 136a) is described.

As shown in FIG. 9, the force transmitting mechanism (134a, 136a) comprises a protruding pole 134a and a clutch 136a. One end of the protruding pole 134a is pivotably connected to the movable platen 130 via a horizontal shaft 132a. Further, the clutch 136a is pivotably connected to the C-shaped frame 112a via the horizontal shaft 138a. The other end of the protruding pole 134a passes through a through hole in the clutch 136a and a through hole formed in the C-shaped frame 112a. The clutch 136a can change the protruding pole 134a from an immovable state with respect to the clutch 136a to a movable state.

Figure 13:
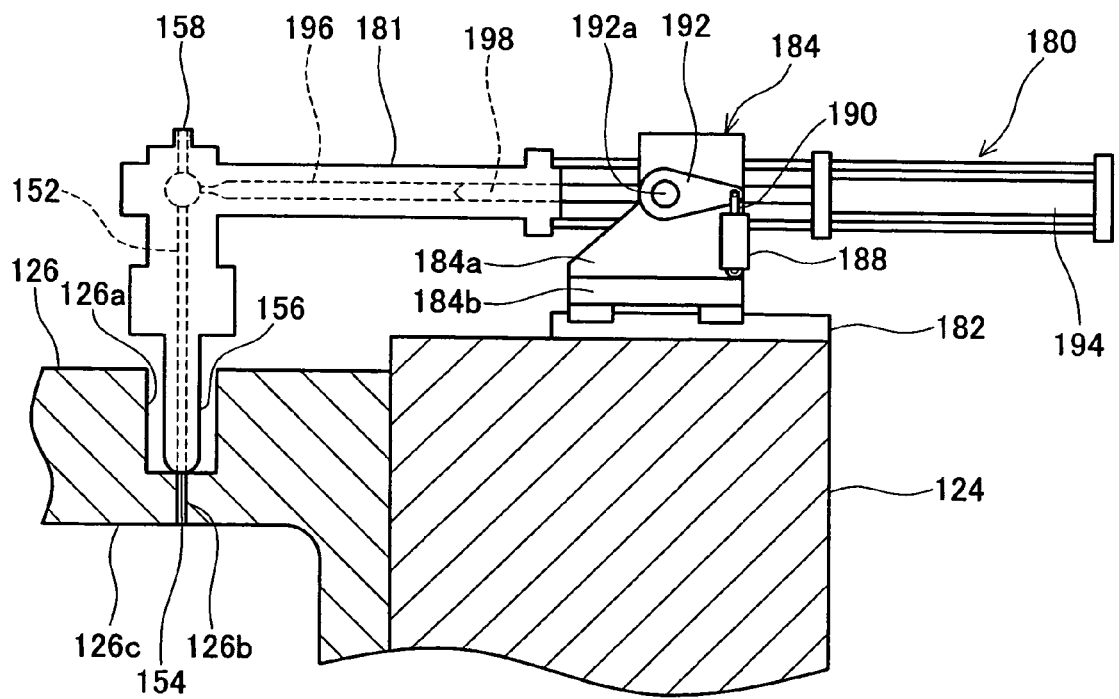
FIG. 13 is a view schematically showing the configuration of a hot runner device provided with the injection molding machine shown in FIG. 9.
Figure 14:
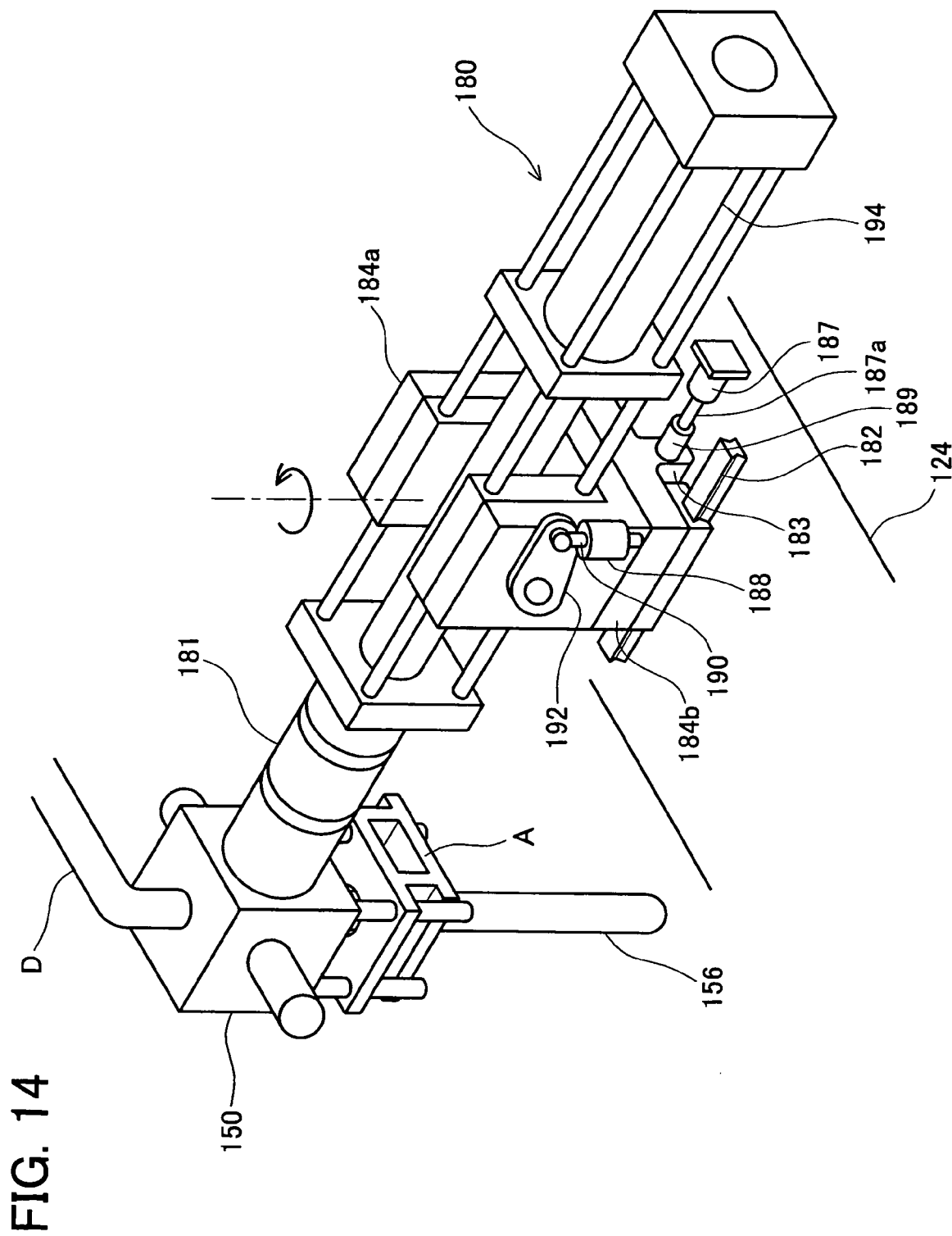
FIG. 14 is a perspective view of the hot runner device shown in FIG. 13.

A hot runner device is mounted on the stationary platen 124 of the injection molding machine described above. The configuration of the hot runner device is described with reference to FIGS. 13 and 14. As shown in FIGS. 13 and 14, guide rails 182 are mounted on the upper surface of the stationary platen 124. A frame 184 is slidably attached to the guide rails 182. The frame 184 comprises a base member 184b that slides on the guide rails 182, and a supporting member 184a attached to the upper surface of the base member 184b.

As shown in FIG. 14, a screw 183 that fits with a ball screw 189 is formed on the lower surface of the base member 184b. An output shaft 187a of the motor 187 is connected to the ball screw 189, and the motor 187 is fixed to the stationary platen 124. As a result, when the motor 187 rotates and causes the ball screw 189 to rotate, the base member 184b is guided into the guide rails 182, allowing it to move forward and backward. The supporting member 184a is capable of rotating around the z-axis (shown by the chain line in FIG. 14). The supporting member 184a may be rotated by a motor or the like.

A shaft 192a is rotatably supported by the supporting member 184a of the frame 184. A hot runner body 180 is fixed on the shaft 192a. One end of a transmission member 192 is fixed to the shaft 192a, and the other end of the transmission member 192 is connected to a piston rod 190 of the cylinder 188. The piston rod 190 is compressed when the cylinder 188 operates, whereupon the transmission member 192 moves. By this means, the hot runner body 180 swings with respect to the frame 184.

As shown in FIG. 13, the hot runner body 180 comprises an arm member 181 to which the shaft 192a is fixed, and a nozzle 156 attached to the anterior end of the arm 181. The upper end of the nozzle 156 has an inlet opening 158, and the lower end has an outlet opening 154. The inlet opening 158 and the outlet opening 154 are connected by a resin flow path 152. A flexible pipe D (see FIG. 14) is connected to the inlet opening 158, and the other end of the pipe D is connected to a plasticizing machine. Resin that has been melted by the plasticizing machine is supplied to the nozzle 156 via the flexible pipe D. The resin supplied to the nozzle 156 passes through the resin flow path 152 and is discharged from the outlet opening 154.

A storage chamber 196 that has diverged from the resin flow path 152 is formed in the arm member 181 of the hot runner body 180. Resin supplied from the plasticizing machine is stored in the storage chamber 196. A plunger 198 is disposed within the storage chamber 196. The plunger 198 is driven by the cylinder 194 provided at the posterior end of the arm member 181 and moves back and forth in the storage chamber 196. When the plunger 198 moves forward in the storage chamber 196, the resin in the storage chamber 196 is injected from the outlet opening 154 of the nozzle 156.

In the injection molding machine described above, a concave portion 126a is formed at the upper surface of the stationary mold 126, this concave portion 126a corresponding to the shape of the product to be molded. A sprue 126b is formed at the base of the concave portion 126a. The hot runner device moves the hot runner body 180 in accordance with the location of the sprue 126b formed on the stationary mold 126. That is, by sliding the frame 184 along the guide rails 182 the hot runner body 180 can be moved forward toward the stationary mold 126, and by rotating the supporting member 184a of the frame 184 with respect to the base member 184b the hot runner body 180 is rotated about the z axis. The nozzle 156 of the hot runner body 180 is thus moved to the position corresponding to the concave portion 126a of the stationary mold 126. The cylinder 188 is operated, thereby causing the piston rod 190 to expand, and causing the hot runner body 180 to swing. The nozzle 156 thus makes contact with the sprue 126b of the stationary mold 126. When the mold is to be replaced, the nozzle 156 is removed from the concave portion 126a of the stationary mold 126 following the reverse sequence of the steps described above.

As is clear from the above description, in the injection molding machine of the present embodiment, since the hot runner body 180 can rotate with respect to the stationary platen 124 and can move forwards and backwards with respect to the stationary mold 126, it is possible to allow the position of the nozzle 156 to be moved over a large range. For this reason, the location of the sprue 126b formed on the stationary mold 126 can be designed with relative freedom.

Moreover, in the injection molding machine of the present embodiment, no tie-bar is necessary for receiving the cramping force since the C-frames 112a and 112b receive the cramping force generated by the stationary mold 126 and the movable mold 128. As a result, when the nozzle 156 is brought into contact with the sprue 126b, the movement of the hot runner body 180 is not adversely affected by tie-bars, and the arm member 181 of the hot runner body 180 can be brought close to the stationary mold 126. For this reason, the nozzle 156 (the resin flow path 152) can be made shorter, thus allowing injection of the resin under low pressure.

Furthermore, the C-shaped frames 112a and 112b, which receive the cramping force generated by the stationary mold 126 and the movable mold 128, and the sliding beds 140a and 140b, which support the stationary platen 124 and the movable platen 130, are formed separately. For this reason, even if the C-shaped frames 112a and 112b deform due to the mold cramping force, the sliding beds 140a and 140b do not deform, thereby maintaining the parallel relationship between the stationary platen 124 and the movable platen 130 during molding. As a result, space does not form between the stationary mold 126 and the movable mold 128, and the occurrence of burrs or the like in the molded object is prevented.

In the above embodiment, although the hot runner device is mounted on the upper surface of the stationary platen 124, it can equally be mounted on another location. For example, the hot runner device can be mounted on the side surface of the stationary platen 124.

Moreover, a guide member that guides a base portion A of the nozzle 156 can also be provided on the stationary mold 126. In such a case, when the frame 184 moves toward the stationary mold 126, it is preferable that the base portion A of the nozzle 156 is guided by the guiding portion, and by this means the nozzle 156 can be moved to a position corresponding to the position of the concave portion 126a. With this configuration, it is not necessary to adjust the position of the hot runner body 180 in z axis direction. It is consequently not necessary to provide a mechanism for adjusting the position of the hot runner body 180 about the z axis.

The above gives a detailed description of embodiments according to the present invention; however, these are merely examples. The present invention may be embodied in various modifications and changed forms.

For example, in the hot runner device of the first embodiment, the nozzle can be embodied so as to move rotatably in an independent manner. That is, the resin flow path provided in the hot runner body and the nozzle are connected by a flexible pipe, and only the nozzle is rotatively driven by the motor housed in the hot runner body. In such an embodiment, a motor for rotatively driving the hot runner body need no longer be provided at the posterior side of the hot runner device. This is an advantage in the case where limited space is available at the posterior side of the hot runner device.

Furthermore, the location where the hot runner device of the embodiments described above is attached is not limited to the stationary platen or the stationary mold. For example, the hot runner device can be attached to the movable mold or the movable platen. Moreover, a base can be provided on the side of the mold, and the hot runner device can be mounted on the base.

Further, the technical components described in this specification or in the drawings exhibit technical utility singly or in various combinations and are not limited to the combinations recited in the claims as filed. The techniques illustrated in this specification or in the drawings attain a plurality of purposes simultaneously, and attaining one of the purposes per se offers technical utility.

The invention claimed is:

1. A hot runner device for discharging supplied molten material to a resin inlet of a mold, comprising:
   a hot runner body comprising an inlet opening into which the molten material is supplied, an outlet opening from which the molten material is discharged, and a flow passage, wherein the inlet opening is formed at one end, and the outlet opening is formed at the other end, and the flow passage connects the inlet opening and the outlet opening, and
   a drive mechanism for driving the hot runner body in a manner that enables the outlet opening to make contact with the resin inlet of each of a plurality of molds whose resin inlets are disposed at different positions,
   wherein the hot runner body can rotate in its axial direction, the outlet opening is disposed at a part other than a rotative axis of the hot runner body, and the drive mechanism is provided with a means for rotating the hot runner body in the axial direction, and
   wherein the hot runner body can move with respect to a mold platen or the mold in a direction towards and away from the resin inlet of the mold.

2. A hot runner device according to claim 1, wherein the inlet opening is disposed at the rotative axis of the hot runner body.

3. A hot runner device according to claim 1, wherein the hot runner body can further move undeviatingly with respect to a mold platen or the mold in a direction perpendicular to the direction towards and away from the resin inlet of the mold, and wherein the drive mechanism is provided with a means for moving the hot runner body in the direction perpendicular to the direction towards and away from the resin inlet of the mold.

4. A hot runner device according to claim 1, wherein a storage for storing molten material supplied from the inlet opening is formed within the flow passage of the hot runner body, and wherein the hot runner body further comprises a means for injecting the molten material stored in the storage from the outlet opening.

5. An injection molding machine comprising:
   a movable mold,
   a stationary mold,
   a movable platen to which the movable mold is removably attached,
   a stationary platen to which the stationary mold is removably attached,
   at least one hot runner device for supplying resin to a resin inlet provided on the movable mold or the stationary mold, the hot runner device further comprising:
      a hot runner body comprising an inlet opening into which the molten material is supplied, an outlet opening from which the molten material is discharged, and a flow passage, wherein the inlet opening is formed at one end, and the outlet opening is formed at the other end, and the flow passage connects the inlet opening and the outlet opening, and
      a drive mechanism for driving the hot runner body in a manner that enables the outlet opening to make contact with the resin inlet of each of a plurality of molds whose resin inlets are disposed at different positions,
      wherein the hot runner body can rotate in its axial direction, the outlet opening is disposed at a part other than a rotative axis of the hot runner body, and the drive mechanism is provided with a means for rotating the hot runner body in the axial direction, and
      wherein the hot runner body can move with respect to a mold platen or the mold in a direction towards and away from the resin inlet of the mold, and
   an injector for supplying molten material to the hot runner device.

6. An injection molding machine according to claim 5, wherein the injector comprises an injection hole for injecting the molten material, the injector injecting the molten material to the hot runner device while the injection hole is in contact with the inlet opening of the hot runner device, and wherein the injection molding machine further comprises means for moving the injection hole of the injector to a position corresponding to the position of the inlet opening of the hot runner body when the hot runner body is driven by the drive mechanism such that the position of the inlet opening thereof is moved.

7. An injection molding machine according to claim 6, wherein the at least one hot runner device comprises a plurality of hot runner devices, and each of the hot runner devices is provided with an injector.

8. An injection molding machine according to claim 5, wherein the injector comprises an injection hole for injecting the molten material, and the injection hole and an inlet opening of the hot runner device are connected by a flexible pipe.

9. An injection molding machine comprising:
- a movable mold,
- a stationary mold,
- a movable platen to which the movable mold is removably attached,
- a stationary platen to which the stationary mold is removably attached,
- at least one hot runner device for supplying resin to a resin inlet provided on the movable mold or the stationary mold, the hot runner device further comprising:
  - a hot runner body comprising an inlet opening into which the molten material is supplied, an outlet opening from which the molten material is discharged, and a flow passage, wherein the inlet opening is formed at one end, the outlet opening is formed at the other end, and the openings are offset from one another, and the flow passage connects the inlet opening and the outlet opening, and
  - a drive mechanism for driving the hot runner body in a manner that enables the outlet opening to make contact with the resin inlet of each of a plurality of molds whose resin inlets are disposed at different positions, and
  - wherein a storage chamber for storing molten material supplied from the inlet opening is formed within the flow passage of the hot runner body, and wherein the hot runner body further comprises a piston driven by cylinders for injecting the molten material stored in the storage from the outlet opening, and
- a plasticizing machine for supplying molten material to the hot runner device via a flexible connection.

10. An injection molding machine according to claim 9, wherein the plasticizing machine comprises a supply hole for supplying the molten material to the hot runner device, and the supply hole and the inlet opening of the hot runner device are connected by a flexible pipe.

11. An injection molding machine according to claim 10, wherein the at least one hot runner device comprises a plurality of hot runner devices, and the supply hole of a plasticizing machine is connected with the inlet openings of the plurality of hot runner devices by the flexible pipe.

* * * * *